(12) United States Patent
Link

(10) Patent No.: US 7,164,757 B2
(45) Date of Patent: Jan. 16, 2007

(54) METHODS AND APPARATUS TO MANAGE COLLECT PHONE CALLING LIMITS

(75) Inventor: Michael P. Link, Wheaton, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 62 days.

(21) Appl. No.: 10/984,487

(22) Filed: Nov. 9, 2004

(65) Prior Publication Data

US 2006/0098796 A1  May 11, 2006

(51) Int. Cl.
*H04M 15/00* (2006.01)
*H04M 17/00* (2006.01)

(52) U.S. Cl. .......................... 379/114.21; 379/112.04; 379/124; 379/144.02

(58) Field of Classification Search ........... 379/112.01, 379/112.04, 127.01, 127.06, 144.02, 184, 379/188, 194, 199–200, 207.03, 112.03, 112.08, 379/120, 124
See application file for complete search history.

(56) References Cited

U.S. PATENT DOCUMENTS

| | | | |
|---|---|---|---|
| 5,436,957 A | | 7/1995 | McConnell |
| 5,467,388 A | | 11/1995 | Redd, Jr. et al. |
| 5,524,145 A | * | 6/1996 | Parker ................... 379/210.02 |
| 5,655,013 A | | 8/1997 | Gainsboro |
| 5,864,613 A | * | 1/1999 | Flood ........................ 379/188 |
| 5,926,533 A | * | 7/1999 | Gainsboro .................. 379/188 |
| 5,956,393 A | * | 9/1999 | Tessler et al. ............... 379/197 |
| 6,169,790 B1 | | 1/2001 | Flon |
| 6,246,756 B1 | | 6/2001 | Borland et al. |
| 6,560,323 B1 | * | 5/2003 | Gainsboro .................. 379/188 |
| 6,611,583 B1 | * | 8/2003 | Gainsboro .................. 379/188 |
| 6,654,452 B1 | | 11/2003 | Murray et al. |
| 6,665,376 B1 | * | 12/2003 | Brown ........................ 379/85 |
| 6,665,380 B1 | | 12/2003 | Cree et al. |
| 6,700,957 B1 | | 3/2004 | Horne |
| 6,920,209 B1 | * | 7/2005 | Gainsboro .................. 379/188 |
| 7,106,843 B1 | * | 9/2006 | Gainsboro et al. .......... 379/191 |
| 2002/0071537 A1 | * | 6/2002 | Gainsboro .................. 379/188 |
| 2002/0194096 A1 | * | 12/2002 | Falcone et al. ............... 705/35 |
| 2003/0086546 A1 | * | 5/2003 | Falcone et al. ........ 379/114.21 |

FOREIGN PATENT DOCUMENTS

WO  WO 01/95602  12/2001

OTHER PUBLICATIONS

International Search Report corresponding to International Application No. PCT/US05/22504, Apr. 14, 2006, 4 pages.
Written Opinion corresponding to International Application No. PCT/US2005/22504, Apr. 14, 2006, 5 pages.

* cited by examiner

*Primary Examiner*—Binh K. Tieu
(74) *Attorney, Agent, or Firm*—Hanley, Flight & Zimmerman, LLC

(57) ABSTRACT

Methods and apparatus to manage collect phone calling limits are disclosed. A disclosed example method comprises: determining if collect calls from one or more predetermined locations to a terminating phone number have exceeded a collect calls limit; and determining a future date when collect calls will be permitted from the one or more predetermined locations to the terminating phone number if the collect calls limit has been exceeded.

44 Claims, 9 Drawing Sheets

| Termination Number | Institution | Limit Override | Total Charges | Today | T-1 | T-2 | T-3 | T-4 | T-5 | T-6 | Block Duration |
|---|---|---|---|---|---|---|---|---|---|---|---|
| 123-456-7890 | Ill. $75 | --- | $86.32 | $23.34 | $12.35 | $5.21 | $13.24 | $16.65 | $15.53 | $0.00 | |
| 234-567-8901 | CA. $75 | --- | $69.07 | $13.12 | $12.35 | $5.21 | $3.67 | $8.95 | $12.53 | $13.24 | |
| 345-678-9012 | OH. $75 | $10,000 | $1,579.77 | $342.15 | $213.67 | $543.12 | $12.45 | $56.45 | $90.82 | $321.11 | |
| 456-789-0123 | OH-2. $75 | $50 | $162.13 | $123.68 | $38.45 | $0.00 | $0.00 | $0.00 | $0.00 | $0.00 | |
| ... | ... | ... | ... | ... | ... | ... | ... | ... | ... | ... | ... |

FIG. 4

| Termination Number | Institution | Limit Override | Total Charges | Today | T-1 | T-2 | T-3 | T-4 | T-5 | T-6 | Block Duration |
|---|---|---|---|---|---|---|---|---|---|---|---|
| 123-456-7890 | Ill. $75 | --- | $86.32 | $23.34 | $12.35 | $5.21 | $13.24 | $16.65 | $15.53 | $0.00 | 1 Day |
| 456-789-0123 | OH-2. $75 | $50 | $162.13 | $123.68 | $38.45 | $0.00 | $0.00 | $0.00 | $0.00 | $0.00 | 6 Days |
| ... | ... | ... | ... | ... | ... | ... | ... | ... | ... | ... | ... |

METHODS AND APPARATUS TO MANAGE COLLECT PHONE CALLING LIMITS

FIELD OF THE DISCLOSURE

This disclosure relates generally to collect phone call management, and, more particularly, to methods and apparatus to manage collect phone calling limits.

BACKGROUND

Often, inmates at correctional institutions wish to place collect phone calls to friends and family members. Such phone calls from inmates can create substantial toll charges to the persons at the terminating phone number. Historically, a portion of such toll charges have been uncollectible, thus, causing the Regional Bell Operating Company (RBOC) providing the service to incur losses.

To address this situation, various approaches to limit collect calls from inmate facilities have been employed. In general, these call velocity limit systems track collect calls to terminating phone numbers over time to ensure that a toll limit is not exceeded within a predetermined time period. Once the toll limit is exceeded, further calls to the over-limit terminating number are blocked for some time period.

The prior art call velocity limit systems have employed various toll limit metrics. For example, some prior art collect call velocity limit systems enforce a temporary ban on collect calls after a predetermined number of collect phone calls or collect phone call attempts to a terminating number have occurred within a predetermined time period. Other approaches temporarily prevent further collect phone calls after the monetary value of collect phone calls to a terminating number within a predetermined time period have exceeded a predetermined toll limit.

The prior art call velocity limit systems have also employed various time period metrics. For example, hourly, daily, weekly and/or monthly limits have been used by prior art systems. Further, some of the prior art systems have employed a fixed time window when determining if a collect call limit has been exceeded. Others have employed a rolling time window in this role.

Some prior art call velocity systems have notified calling and/or called parties that collect calls are being blocked, no known prior art system has notified these parties of the future date when the call block would be removed. Further, no known prior art system notified service representatives of the future date when such a call block would be lifted. Further, while the service representative might try to manually determine a future date when the restriction would be removed, this inquiry would be a time consuming process. Therefore, inquiries from individuals concerning collect call blocks have traditionally resulted in uninformative and/or lengthy call center calls.

BRIEF DESCRIPTION OF THE DRAWINGS

FIG. 4 is an example total-limits comparison table.

FIG. 5 is the example total-limits comparison table of FIG. 4 shown after pruning.

DETAILED DESCRIPTION

Figure 1:
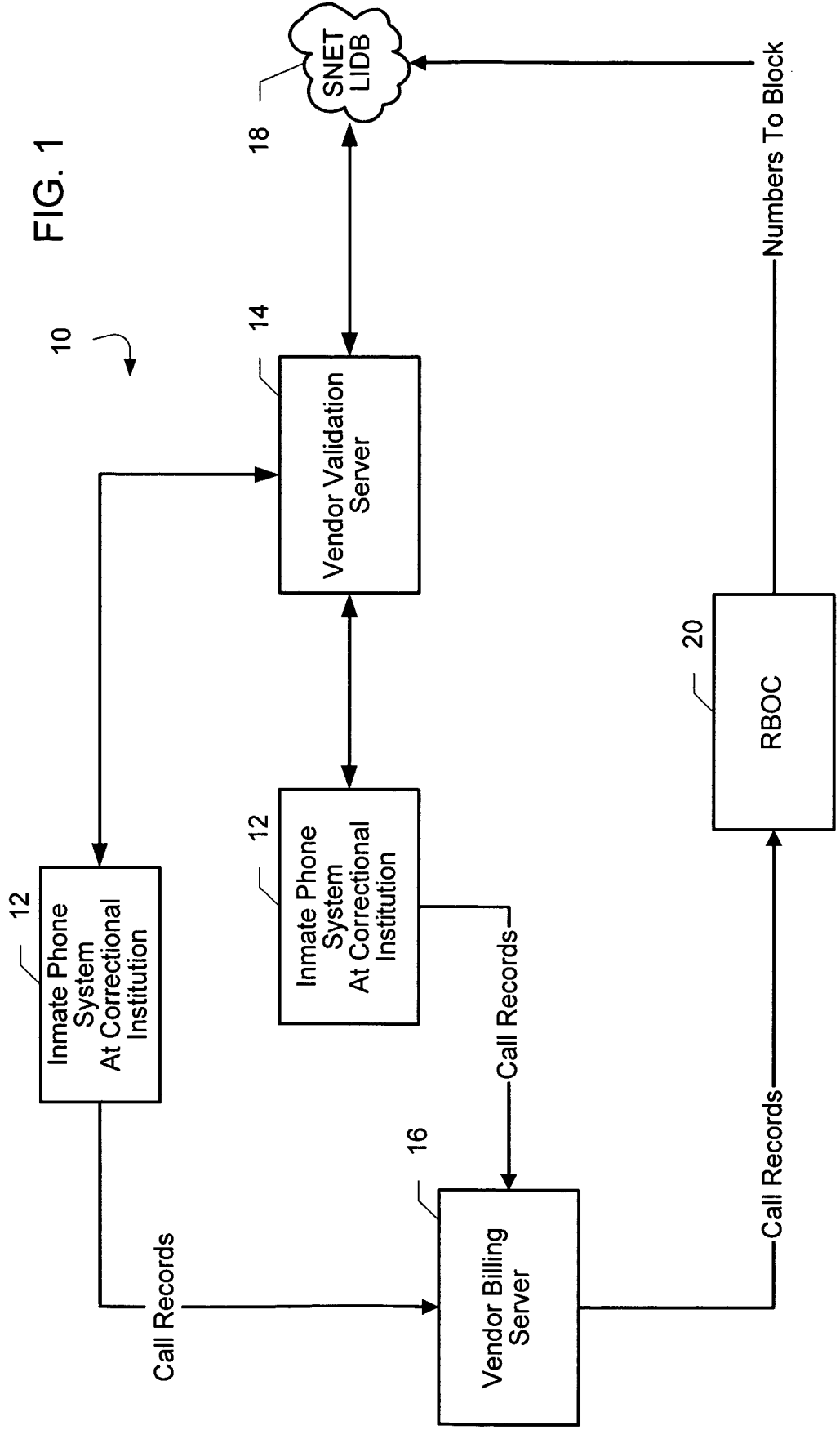
FIG. 1 is a schematic illustration of a prior art collect phone call management system.

FIG. 1 is a schematic illustration of an example prior art collect call velocity limit system 10. In the illustrated system, one or more vendors such as T-Netix of Dallas, Tex. provide the inmate phone systems in one or more correctional institutions 12. Although for simplicity of illustration, only two correctional institutions 12 are shown in FIG. 1, persons or ordinary skill in the art will appreciate that many more than two correctional institutions 12 located in various geographic locations may be present. Further, although in the example of FIG. 1 and the remainder of this detailed description, references will be made to correctional institutions/prisons and inmates, persons of ordinary skill in the art will readily appreciate that other types of institutions including, by way of examples, not limitations, hospitals, boarding schools, military bases, etc. could alternatively be serviced by the system of FIG. 1 and/or by the methods and apparatus described below in connection with FIGS. 2–7. Similarly, although for simplicity of illustration only one vendor validation server 14 and one vendor billing server 16 is shown in FIG. 1, more than one validation server 14 associated with one or more vendors and/or one or more billing servers 16 associated with one or more vendors may also be present. Also, although only one Line Information Database (LIDB) 18 and one Regional Bell Operating Company (RBOC) 20 are shown in FIG. 1, more than one LIBD 18 and/or more than one RBOC 20 may also be present.

Returning to the example of FIG. 1, when an inmate attempts to place a collect phone call, the inmate phone system at the correctional institute 12 sends a message to the validation server 14 of the vendor servicing the associated correctional institute 12. The vendor validation server 14 queries a Line Information Database (LIDB) 18 such as the SNET (Southern New England Telephone) LIDB to determine if a collect call or other restriction has been placed on the termination number the calling inmate is seeking to reach. The LIDB 18 is a database associating termination numbers with codes placing restrictions on, and/or indicating services to be provided with, calls placed to termination numbers. A separate customer ID has been setup with SNET LIDB to validate collect call attempts from correctional facilities. The blocked terminating numbers are identified in the LIDB 18 under this customer ID so that only collect calls from correctional facilities managed by SBC are affected by the block, and no other calls, including collect calls, to the terminating number are impacted. Persons of ordinary skill in the art will appreciate that other collect call blocking approaches are also possible. For example, an institutional collect call blocking code could be adopted which, when associated with a termination number in the LIDB 18, indicates that collect calls from correctional facilities 12 to that termination number are precluded. Irrespective of the manner of identifying blocked termination numbers in the LIDB 18, if the LIDB 18 does not return a code blocking collect calls, there is no restriction precluding such a call and, accordingly, the vendor validation server 14 permits the inmate's collect call to be placed through the public switched telephone network (not shown) in the usual manner. If, however, the LIDB 18 returns a collect call blocking code, the vendor validation server 14 prevents placement of the call. Typically, the inmate phone system 12 will play a recording to the inmate indicating that the call is not permitted at this time.

As shown in FIG. 1, in addition to the vendor validation server 14, the vendor also maintains a vendor billing server 16. The vendor billing server 16 maintains call records identifying the time and date of calls placed from the inmate correctional phone system, the duration of such calls, and the termination numbers associated with those calls. These call records will primarily relate to collect calls. However, it may also include records relating to calls initiated, for example, with a pre-paid calling card.

The call records compiled by the vendor validation server 16 are periodically (e.g., once per business day) transferred to the RBOC 20 that actually services the calls. The RBOC 20 rates and bills the calls, and determines whether any termination number has exceeded a collect call limit. If a termination number is in excess of the collect call limit, the RBOC 20 adds the terminating number to the list of blocked numbers in the LIDB 18 under the customer ID which is used for correctional collect calls. The RBOC 20 also removes the terminating number from the list of blocked numbers in the LIDB 18 under the customer ID used for correctional collect calls when the collect calling restriction is lifted.

In the prior art system of FIG. 1, the collect call limit is based on the identity of the correctional institute(s) from which the collect calls are originating. However, some termination numbers may be provided with an override limit. For example, termination numbers associated with law offices, public defenders offices, etc. are typically provided with a very high override limit such that, effectively, no collect calls are ever blocked to that terminating number. On the other hand, termination numbers that have had past payment delinquencies may be provided with lower limit overrides.

Figure 2:
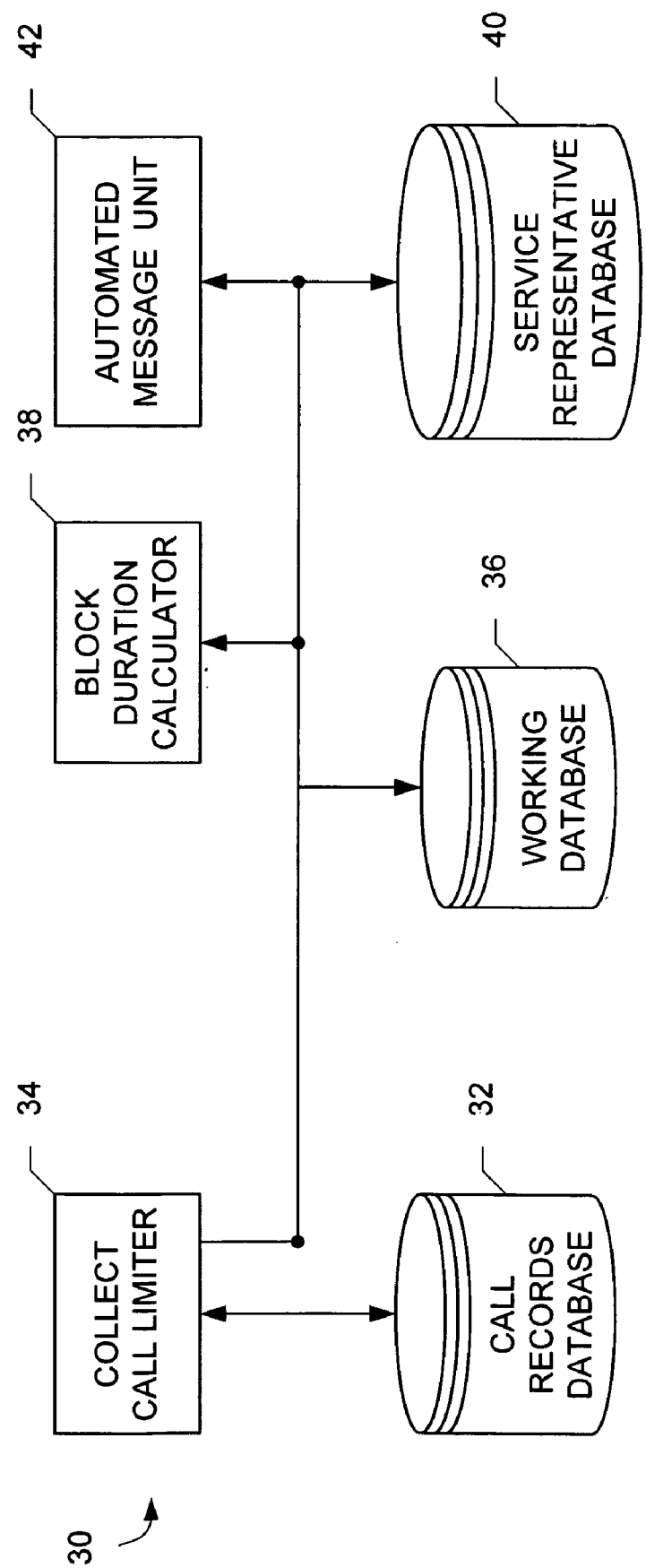
FIG. 2 is a schematic illustration of an example apparatus to manage collect phone calling limits constructed in accordance with the teachings of the present invention.

An example apparatus 30 to manage collect phone calling limits is shown in FIG. 2. The apparatus 30 may be located at the Inmate Phone System 12, an RBOC 20, or at a vendor providing a phone system to an institution (e.g., at the vendor validation server 14 and/or vendor billing server 16). Irrespective of its location, the apparatus 30 is provided with access to a call records database 32 containing the call records developed by the vendor server(s) 14, 16. Access to this data enables the apparatus 30 to determine when collect calls from one or more institutions 12 to one or more destination numbers have exceeded a predetermined collect call limit.

In the illustrated example, the apparatus 30 includes a collect call limiter 34. The collect call limiter 34 examines the call records in the call records database 32 to identify any termination number(s) which have received more than the collect calls limit of collect calls from one or more predetermined locations such as correctional institutions 12. The collect calls limit may be a number of connected collect calls, a number of attempted collect calls, and/or a monetary value of connected collect calls. The collect call limit may be referenced to a predetermined time period. For example, the predetermined time period may be a number of hours, a number of days, a number of weeks or a number of months. Further, the time period may be a fixed time period (e.g., a series of sequential, non-overlapping time periods) or a rolling time period (e.g., a window of a fixed length of time measured backward in time from, and always including, the current time period).

Irrespective of the call limit and time period metrics selected, the collect call limiter 34 of the illustrated example develops a list or table of terminating numbers that have exceeded the collect call limit in a working database 36 or it may be a realtime system that determines whether a particular number has exceeded the limit. Such termination numbers are referred to in the following as "overdrawn termination numbers."

In order to determine a future date when collect calls will be permitted from the institute(s) 12 to the overdrawn termination numbers, the apparatus 30 is further provided with a block duration calculator 38. More specifically, the block duration calculator 38 examines the data associated with each termination number in the working database 36 to determine the date on which the ban on further collect calls will be lifted. Persons of ordinary skill in the art will appreciate that the manner of calculating this future date is dependent on the type of time period and type of collect call limit employed.

Once the future date is calculated, it is written in a service representative database 40 and provided to an automated message unit 42. The automated message unit 42 may be implemented, for example, by an automated outbound message dialer which automatically places a call to the terminating phone number and plays an automated message identifying the future date on which collect calls will again be permitted from the institutions 12 in question. For instance, the automated message dialer 42 may play a message to a human receiving the call or leave a message on an answering machine/service. The message played by the automated message dialer 42 may be, for example, "This is a courtesy call from SBC advising you that the permissible call limit from inmate facilities that SBC manages have exceeded the permissible limit for this time period. Accordingly, no further collect calls from those inmate facilities will be permitted to your number until _____," wherein the blank is filled in with the future date calculated by the block duration calculator 38.

Alternatively or additionally, the automated message unit 42 may be implemented by an interactive voice response unit which is responsive to an inbound call from a person associated with a termination number. Upon entry of the appropriate inputs from a caller, the inbound message unit 42 plays an automated message identifying the future date on which collect calls will again be permitted from the institutions 12 to the termination number in question.

Alternatively or additionally, if call record information is made available in real time or quasi-real time to the apparatus 30, the automated message unit 42 may play a message indicating that all further collect calls will be blocked until the future date calculated by the block duration calculator 38 during the collect call that causes the terminating number to exceed the collect call limit (i.e., during the last permitted call before imposing a temporary block). The advantage of this approach is that both the calling and the called party (i.e., both the inmate and the called person at the terminating number) simultaneously receive the notification of the placement of the block and the future date on which additional calls will be permitted. Because of the need for real time access to the call records, this approach may be best implemented by associating the apparatus 30 with a vendor server 14, 16 or otherwise locating the apparatus 30 at the vendor or institution 12.

Additionally or alternatively, because the future date at which collect calls from an institution 12 to a terminating number will be permitted is stored in the service representative database 40, should a person associated with a termination number call a service representative to inquire as to when the collect call block will be lifted, the service representative can quickly provide this information by simply using the termination number as a key to look-up the future date in the service representative database 40. As a result, call center calls inquiring as to collect call blocks from institutions can be more informative and shorter than in prior art scenarios.

Figure 3:
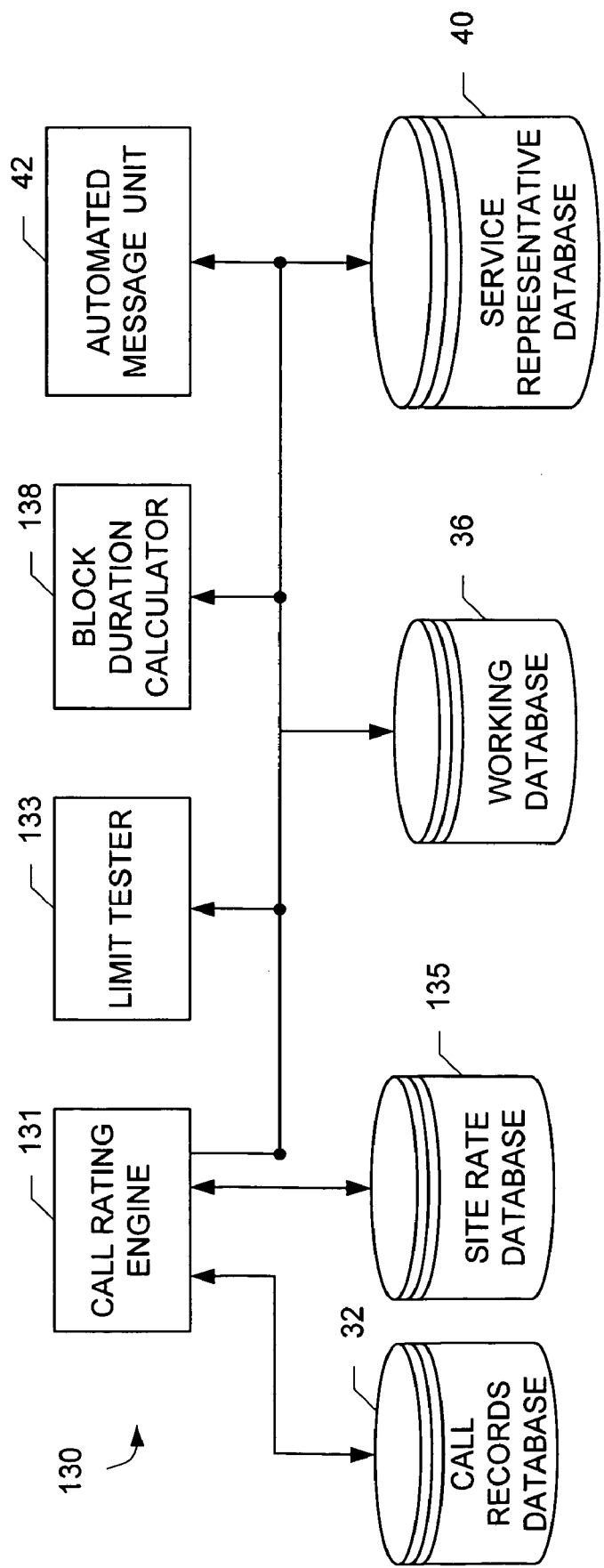
FIG. 3 is a schematic illustration of an example manner of implementing the apparatus of FIG. 2.
Figure 6A:
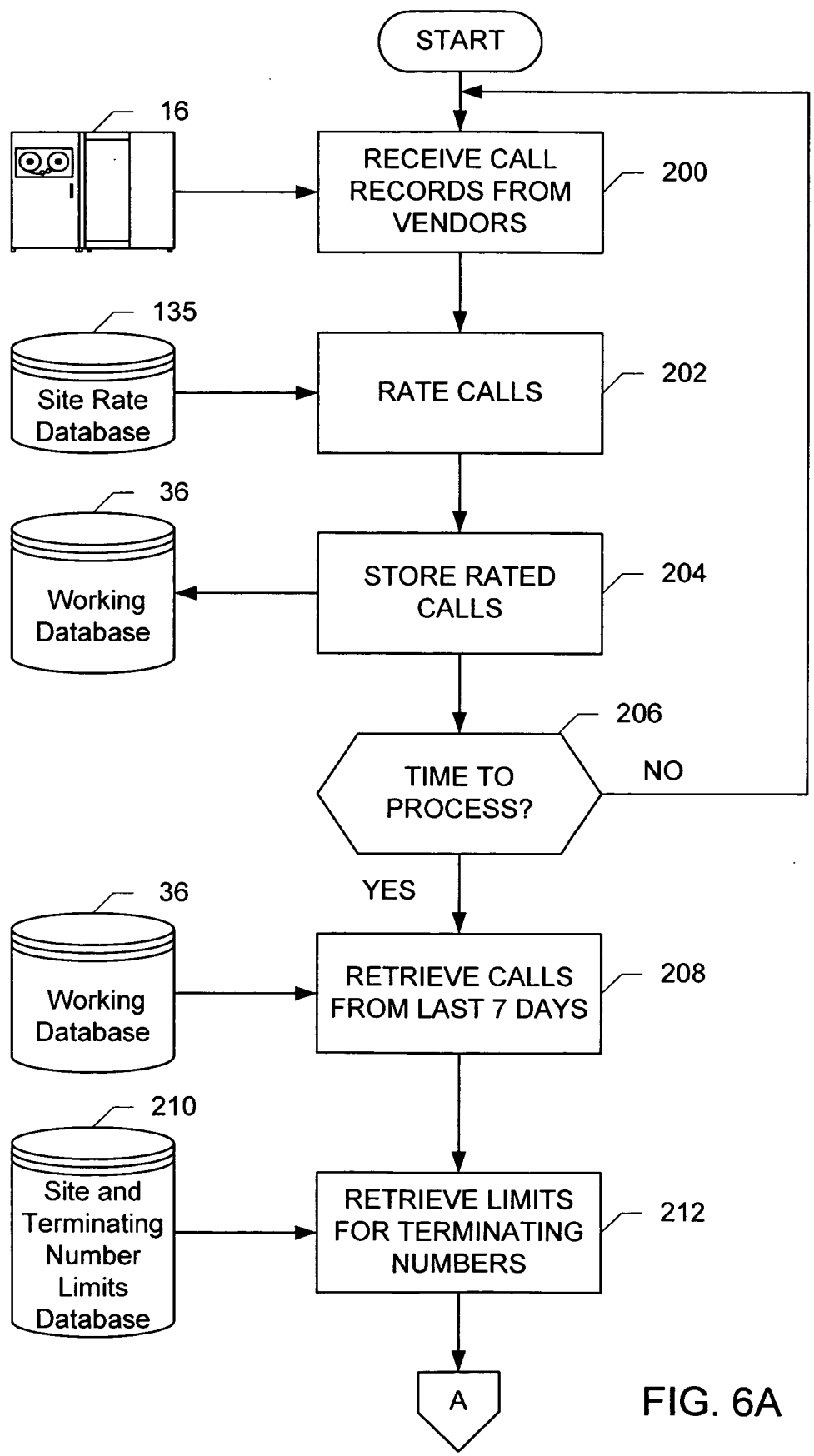
FIGS. 6A–6D are a flowchart representative of example machine readable instructions that may be executed to implement the apparatus of FIG. 3.
Figure 6B:
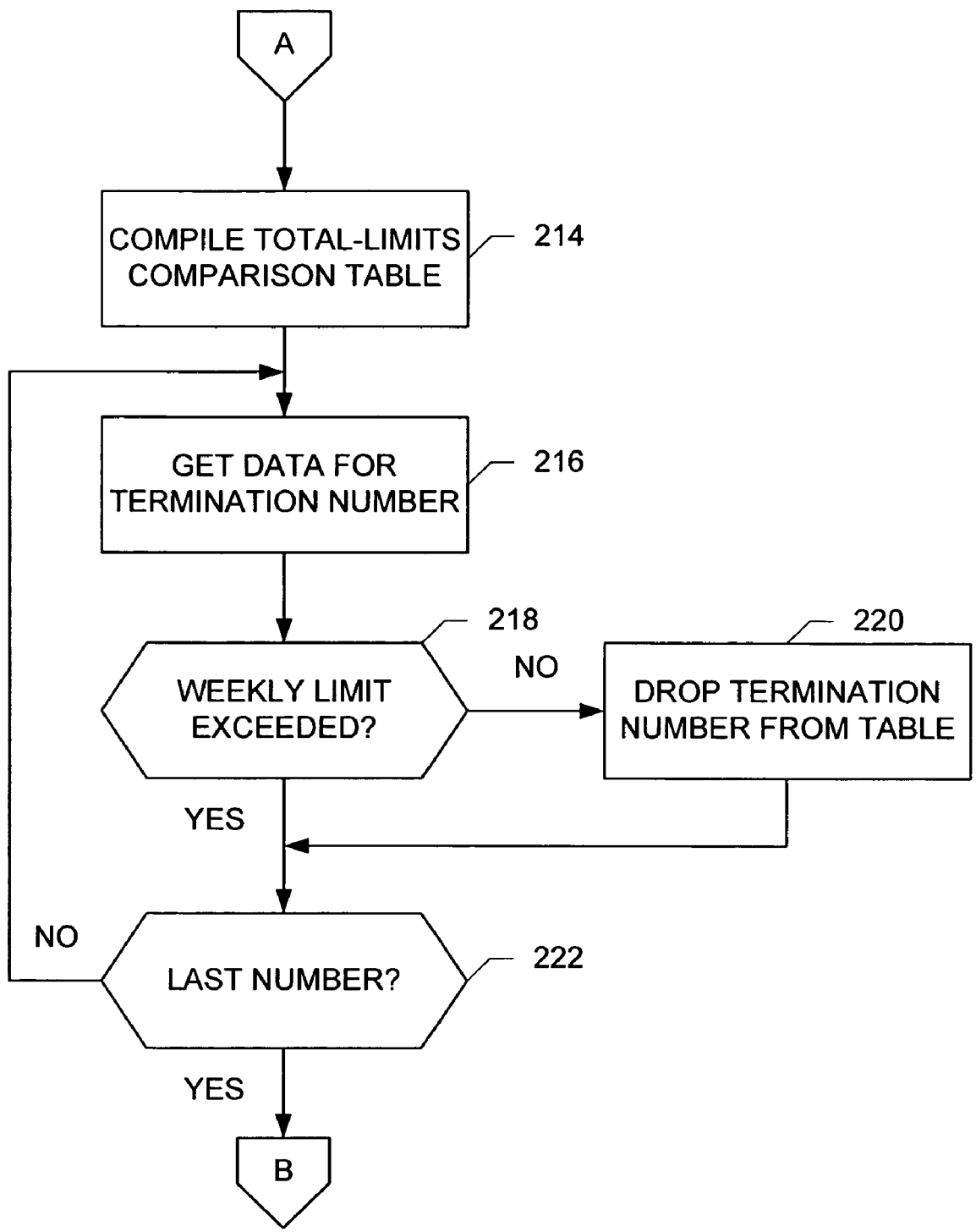
Figure 6C:
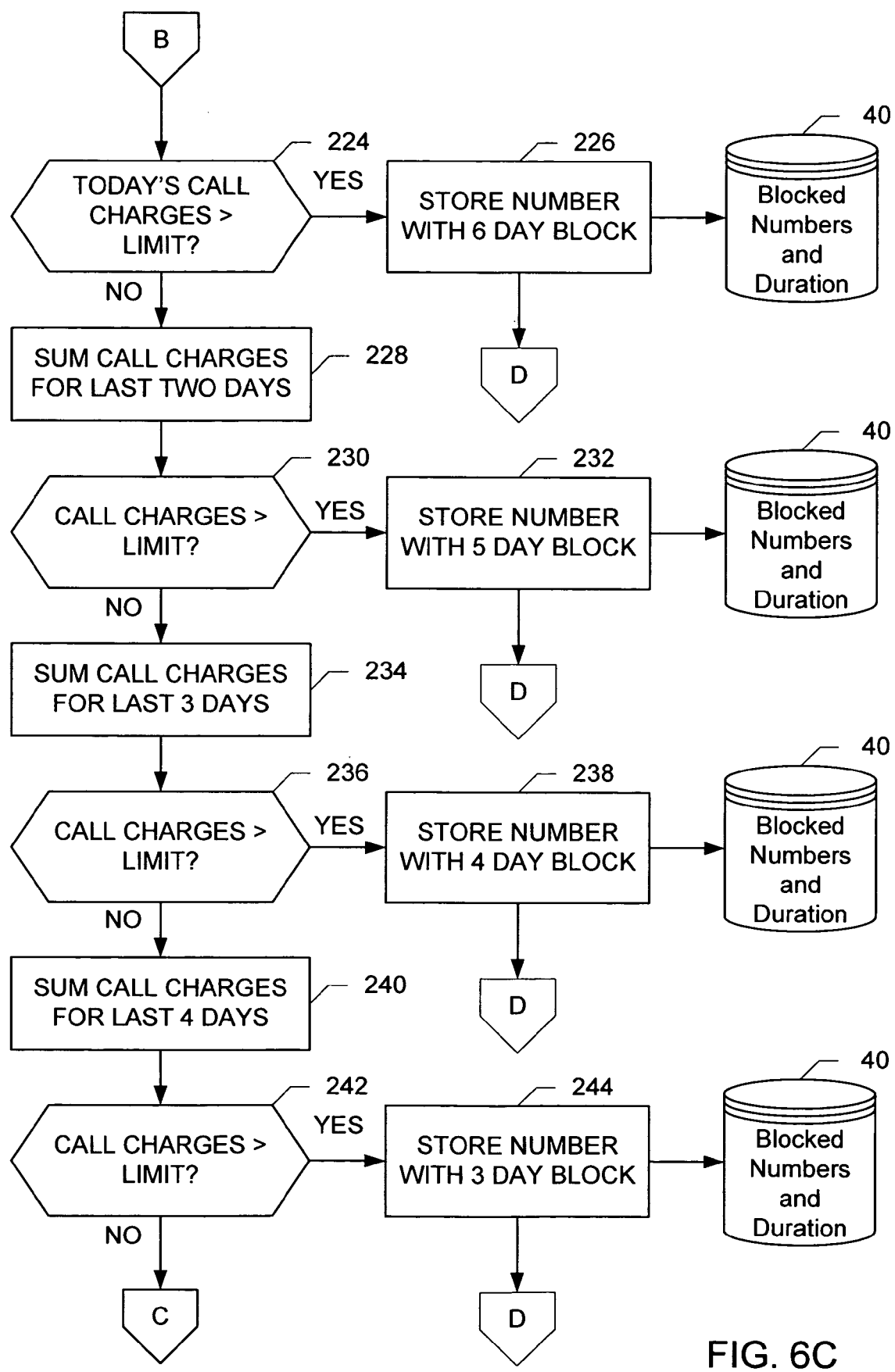
Figure 6D:
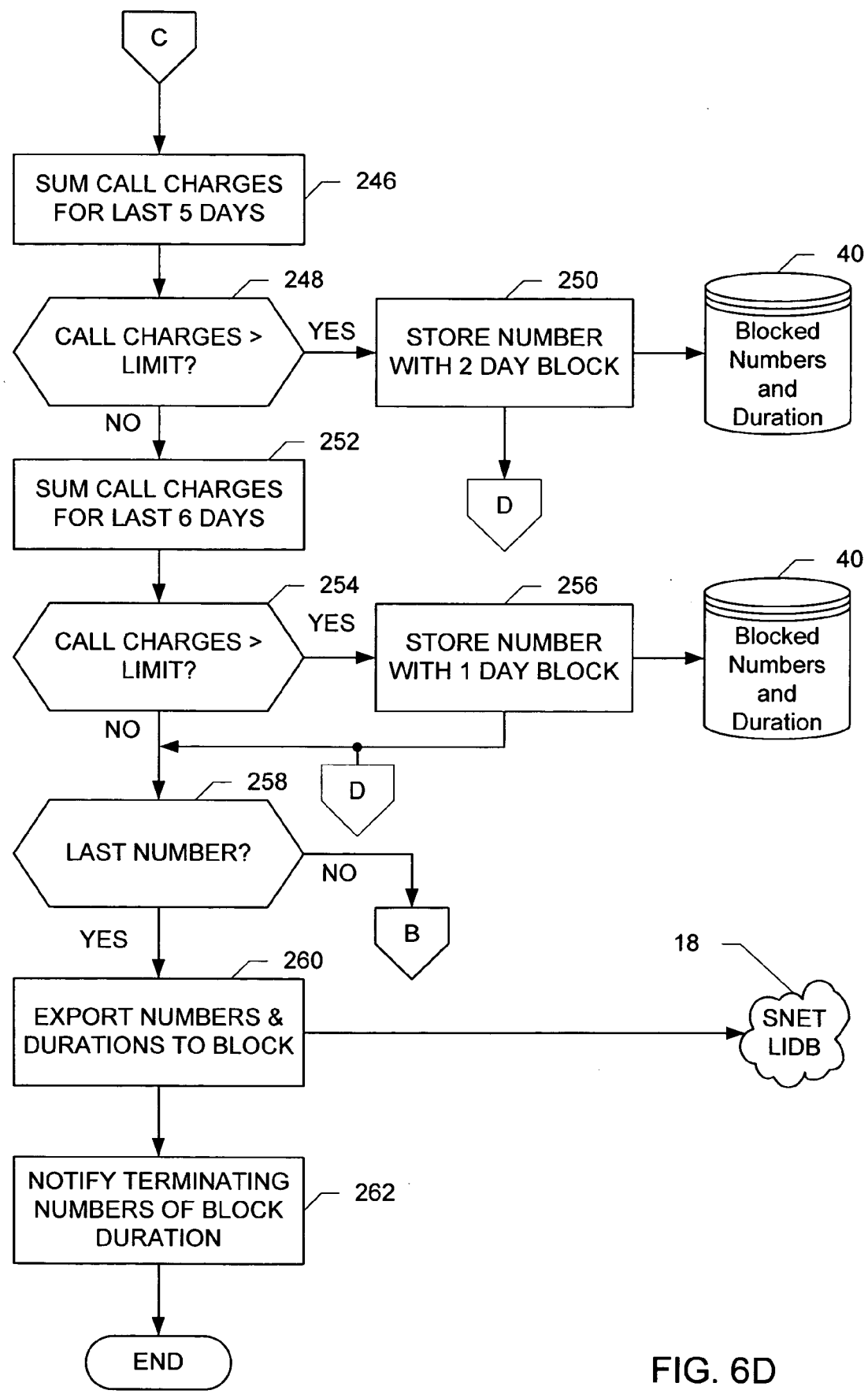

An example manner of implementing the apparatus 30 is shown in FIG. 3. Many of the structures of FIG. 3 are similar or identical to the structures of FIG. 2. Accordingly, other than to point out differences, a description of the corresponding structures of FIG. 2 will not be repeated with respect to FIG. 3. Instead, the interested reader is referred to the discussion of FIG. 2 for a complete discussion of those structures. To facilitate this process, like reference numerals refer to like structures throughout the drawings.

In the example of FIG. 3, the collect call limiter 34 is implemented by a call rating engine 131 and a limit tester 133. In addition to having access to the call records database 32, the call rating engine 131 also has access to a site rate database 135. The site rate database 135 identifies the toll schedule(s) for calls of various distances on a day part by day part basis. The call rating engine 131 utilizes the toll schedule(s) to determine the call tolls for the collect calls placed to terminating numbers from the institutions 12 being serviced. These tolls are stored in the working database 36.

An example manner of storing the tolls charges in the working database 36 is shown in FIG. 4. In the example of FIG. 4, the data in the working database 36 is stored in a total-limits comparison table. The total-limits comparison table includes a column which identifies each termination number associated with at least one collect call from at least one correctional institution 12. It also includes a column identifying the institution from which the collect calls originated and the call limit associated with that institution. It is possible for a termination number to appear more than once in the table if, for example, the termination number receives collect calls from more than one serviced institution 12. Alternatively, a single row entry could be used to group collect calls to a termination number from more than one institution 12. In the illustrated example, the collect call limit is a rolling weekly toll limit, and the collect call limit for the institutions is $75 per week.

As mentioned above, it is possible for a terminating number to have a collect call limit override that permits greater or fewer collect calls to the terminating number than would otherwise be provided under the institution's collect call limit. Therefore, a third column of the total-limits comparison table identifies any collect call limit override for each termination number. In the example of FIG. 4, one of the termination numbers (i.e., number 345-678-9012) has an extremely high limit override of $10,000. Such a virtually unlimited termination number could be, for example, a public defenders or criminal lawyer's office. Also in the example of FIG. 4, another termination number (i.e., 456-789-0123) has an override limit of $50/week. This reduced override limit might be enforced, for example, against a terminating number with a poor payment history.

Further columns of the total-limit comparison table of FIG. 4 allocate the collect call tolls on a time period-by-time period basis. Since, in the illustrated example, the collect call limit is a rolling one week time period, there are seven daily collect call toll columns; one for each day of the current period. In addition to the time period-by-time period toll columns, there is a total tolls column reflecting the sum of collect call tolls to the corresponding termination number during the time period in question.

Returning to FIG. 3, in order to reduce the size of the total-limit comparison table, the apparatus 130 includes a limit tester 133. By comparing the sum of collect tolls to the collect call limit of the corresponding termination number, the limit tester 133 can shorten the length of the total-comparison table by eliminating rows corresponding to termination numbers that have not exceeded their collect call limit during the time period in question. Thus, for example, the entries for termination number 234-567-8901 and termination number 345-678-9012 are eliminated from the example table of FIG. 4 to arrive at the example pruned table of FIG. 5.

Once the total-limit comparison table is pruned, the block duration calculator 138 analyzes the data for each termination number entry in the pruned total-limits comparison table to determine a future date when the block of collect calls from serviced institutions 12 will be lifted for the corresponding termination number. In the illustrated example, the block duration calculator 138 determines the future time period in which collect calls to a terminating number will be permitted by determining a number of sequential time periods in a sequential series of time periods wherein a sum of sub-totals corresponding to the sequential time periods exceeds a toll limit. The sequential time periods are inclusive of the first time period. Once the block duration calculator 138 completes this determination, it identifies a time period occurring immediately after expiration of (the number of time periods in the series of time periods) less (the number of sequential time periods) as the future time period.

In other words, considering the first termination number in the example of FIG. 5, the block duration calculator 138 compares the toll charges for the current day (i.e., $23.34) to the weekly limit (i.e., $75). If the weekly limit was exceeded with just today's toll charges, then the number of sequential toll periods required to exceed the toll limit was one (i.e., today). If the weekly limit was not exceeded by just today's toll charges, then the block duration calculator 138 sums today's toll charges (i.e., $23.34) and yesterday's toll charges (i.e., $12.35), and compares that sum to the weekly limit. This process is continued, with the block duration calculator 138 adding one additional day of charges to the running sum of toll charges, until the running sum exceeds the weekly toll limit. In the example of FIG. 5, the running sum exceeds the weekly limit after six days (inclusive of the current day). Thus, the block duration calculator 138 determines that the number of sequential time periods wherein the sum of sub-totals corresponding to the sequential time periods exceeds the toll limit is six.

With this calculation complete, the block duration calculator 138 then identifies a time period occurring immediately after expiration of the number of time periods in the series of time periods less the number of sequential time periods as the future time period. In the illustrated example, there are seven time periods, and the number of sequential time periods wherein the sum of sub-totals corresponding to the sequential time periods exceeds the toll limit is six. Therefore, the block duration calculator 138 identifies the future date as one (i.e., 7-6) time period (i.e., one day) away.

In the above examples, the apparatus 30, 130 may be located at and/or integrated in the Inmate Phone System 12, the RBOC 20, at the vendor validation server 14, at the vendor billing server 16, and/or at some other location. Preferably, the vendor billing server 16 provides the call records to the apparatus 30, 130 on a substantially continuous, substantially real time basis. However, the call records may instead be provided quasi-continuously or periodically. Preferably, the apparatus 20, 130 updates the LIBD 18 with the terminating numbers that are to be blocked, and the duration of the block (e.g., by identifying the future date on which collect calls will again be permitted). This future date may also be provided directly to the vendor validation server 14 and/or directly to the vendor billing server 16.

A flowchart representative of example machine readable instructions for implementing the apparatus 30, 130 of FIG. 3 is shown in FIGS. 6A–6D. In this example, the machine readable instructions comprise a program for execution by a processor such as the processor 1012 shown in the example computer 1000 discussed below in connection with FIG. 7. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the collect call limiter 34, the block duration calculator 38, 138, the call rating engine 131, and/or the limit tester 133 could be implemented by software, hardware, and/or firmware. Further, although the example program is described with reference to the flowchart illustrated in FIGS. 6A–6D, persons of ordinary skill in the art will readily appreciate that many other methods of implementing the example apparatus 30, 130 may alternatively be used. For example, the order of execution of the blocks may be changed, and/or some of the blocks described may be changed, eliminated, or combined.

The program of FIGS. 6A–6D begins at block 200 where the collect call limiter 34 receives the call records from the vendor validation server(s) 14. The call rating engine 131 accesses the site rate database 135 and applies the rate schedule(s) to the call records to associate toll charges with the records (block 202). The rated calls are then stored in a working database 36 (block 204).

The collect call limiter 34 then determines if it is time to process the rated call records (block 206). If not, control returns to block 200. Otherwise, control advances to block 208. Persons of ordinary skill in the art will appreciate that the processing of the data call records could occur periodically as suggested in the flowchart of FIG. 6A, or alternatively, the call records could be processed immediately upon being rated. Immediately processing call records is useful, for example, where call records are provided on a continuous or quasi-continuous basis to ensure collect call bans are invoked as soon as the appropriate call limit is exceeded.

When it is time to process the calls, the collect call limiter 34 sums the collect call charges from the last seven days (inclusive of the current day) on a terminating number by terminating number basis (block 208) from the working database 36. It also retrieves the toll limits for the terminating numbers from a site and terminating number limits database 210 (block 212). The site and terminating number limits database 210 may, for example, be part of the site rate database 135 or may be a separate database.

The data compiled by the collect call limiter 34 is stored in a total-limits comparison table (see, for example, FIG. 4) (block 214). The limit tester 133 then begins pruning the total-limits comparison table. In particular, it retrieves the total toll charges accrued by first termination number in the relevant time period and the weekly limit for that termination number (block 216). It then determines if the weekly limit has been exceeded by the termination number's collect tolls from the serviced institution(s) in question (block 218). If the weekly limit has not been exceeded (block 218), the termination number is dropped from the table (block 220) and control then advances to block 222. (If the terminating number was previously blocked and has just entered the unrestricted state, the LIBD database 18 may also be updated to ensure that collect calls are permitted to the terminating number).

If, at block 218, it is determined that the terminating number has exceeded its limit, control advances directly to block 222 without passing through block 220.

At block 222, the limit tester 133 determines whether there are additional termination numbers to test for a weekly limit violation. If so, control returns to block 216 where the process of examining the next termination number proceeds. Otherwise, if all of the terminating numbers have been examined for a weekly limit violation, control proceeds to block 224.

At block 224, the block duration calculator 138 determines whether the collect call charges incurred today by the first terminating number in the total-limits comparison table exceeds its toll limit. If the limit was exceeded with just today's calls, a six day block is stored in the service representative database 40 in association with the terminating number (block 226). Control then proceeds to block 258. If the limit was not exceeded with just today's calls, control proceeds to block 228. At block 228, the block duration calculator 138 sums the collect call tolls for the last two days (i.e., today and yesterday). Control then proceeds to block 230.

At block 230, the block duration calculator 138 determines whether the collect call charges incurred in the last two days by the first terminating number in the total-limits comparison table exceeds its toll limit. If the limit was exceeded with the last two day's calls, a five day block is stored in the service representative database 40 in association with the terminating number (block 232). Control then proceeds to block 258. If the limit was not exceeded with the last two day's calls, control proceeds to block 234. At block 234, the block duration calculator 138 sums the collect call tolls for the last three days. Control then proceeds to block 236.

At block 236, the block duration calculator 138 determines whether the collect call charges incurred in the last three days by the first terminating number in the total-limits comparison table exceeds its toll limit. If the limit was exceeded with the last three day's calls, a four day block is stored in the service representative database 40 in association with the terminating number (block 238). Control then proceeds to block 258. If the limit was not exceeded with the last three day's calls, control proceeds to block 240. At block 240, the block duration calculator 138 sums the collect call tolls for the last four days. Control then proceeds to block 242.

At block 242, the block duration calculator 138 determines whether the collect call charges incurred in the last four days by the first terminating number in the total-limits comparison table exceeds its toll limit. If the limit was exceeded with the last four day's calls, a three day block is stored in the service representative database 40 in association with the terminating number (block 244). Control then proceeds to block 258. If the limit was not exceeded with the last four day's calls, control proceeds to block 246 (FIG.

6D). At block 246, the block duration calculator 138 sums the collect call tolls for the last five days. Control then proceeds to block 248.

At block 248, the block duration calculator 138 determines whether the collect call charges incurred in the last five days by the first terminating number in the total-limits comparison table exceeds its toll limit. If the limit was exceeded with the last five day's calls, a two day block is stored in the service representative database 40 in association with the terminating number (block 250). Control then proceeds to block 258. If the limit was not exceeded with the last five day's calls, control proceeds to block 252. At block 252, the block duration calculator 138 sums the collect call tolls for the last six days. Control then proceeds to block 254.

At block 254, the block duration calculator 138 determines whether the collect call charges incurred in the last six days by the first terminating number in the total-limits comparison table exceeds its toll limit. If the limit was exceeded with the last six day's calls, a one day block is stored in the service representative database 40 in association with the terminating number (block 256). Control then proceeds to block 258. If the limit was not exceeded with the last six day's calls, control proceeds to block 258. (Theoretically, control should never pass directly from block 254 to 258 unless a terminating number that did not exceed its limit was somehow left in the table by the limit tester 133).

At block 258, the block duration calculator 138 determines whether all of the terminating numbers in the total-limits comparison table have been analyzed. If not, control returns to block 224 (FIG. 6C) where the next termination number in the pruned total-limits comparison table is analyzed as explained in connection with blocks 224–258. Otherwise, when all of the terminating numbers have been analyzed, control proceeds to block 260.

At block 260, the apparatus 30, 130 exports the terminating numbers and the block durations/future date to unblock to the LIBD 18 and/or the vendor server(s) 14, 16. The automated message unit then calls the terminating numbers to notify them of the block and the future day when the block will be removed (block 262). Control then terminates or returns to block 200 of FIG. 6A.

Figure 7:
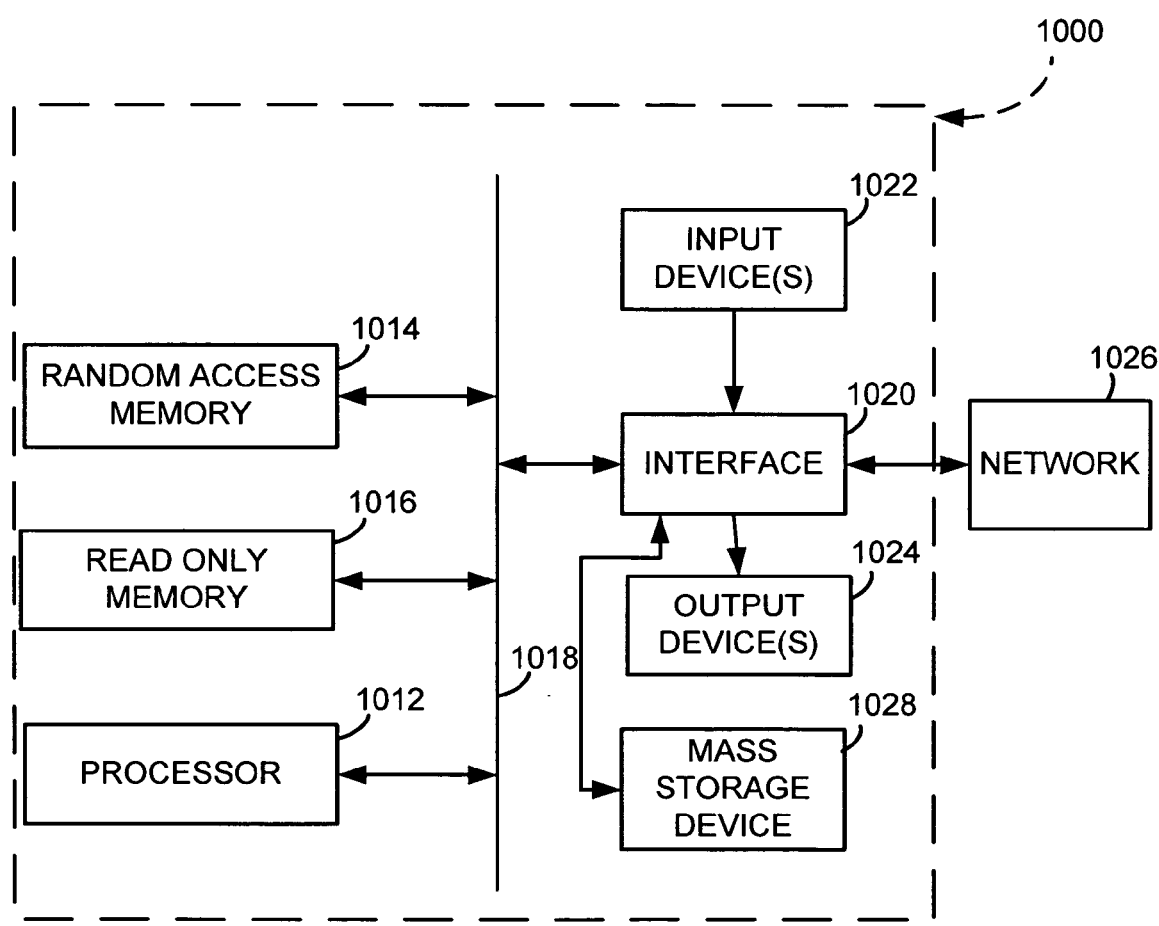
FIG. 7 is a schematic illustration of an example computer that may be programmed to execute the instructions represented by FIGS. 6A–6D to implement the apparatus of FIG. 3.

FIG. 7 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device. By way of example, not limitation, the computer can be the vendor validation server 14 or a server at the RBOC.

The system 1000 of the instant example includes a processor 1012. For example, the processor 1012 can be implemented by one or more Intel® microprocessors from the Pentium® family, the Itanium® family, the Centrino™ family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 may be connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 may also be connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the local storage device 62.

From the foregoing, persons of ordinary skill in the art will appreciate that the above disclosed methods and apparatus enable enforcement of collect call limits while advising the effected party at the terminating number of a future date when collect calling privileges from inmate(s) at the serviced institution(s) will be reinstated. In a disclosed method of calculating the duration of the block, the length of the block is not dependent on the amount by which the toll limit was exceeded. However, methodologies which take into account the magnitude of the toll limit overrun in some fashion could likewise be employed.

Persons of ordinary skill in the art will appreciate that the above disclosed methods and apparatus may be modified in many different ways to suit various applications and technological changes. For example, the above disclosed methods and apparatus may be used with an inmate phone system that employs Voice over IP technology. Further, the inmate phone system does not necessarily reside at the correctional facility. For example, T1 lines may be used to carry the dial tone so that the inmate phone system is not at the location of the phones.

As another example modification, the system could be implemented to obtain the billing name and address (BNA) of each terminating number, and then combine the limits for all serviced institutions by BNA. Thus, if for example a person has two phone lines, the system discussed above in connection with FIGS. 6A–6D would allow up to the collect call limit's worth of calls (e.g., $75) for each phone number per time period (e.g., every week). In the modified system where the BNA information is obtained, since both numbers have the same bill name and address, collect call blocks are placed on both phone numbers when the combined amount of collect calls from the serviced institutions exceeds the collect call limit in the relevant time period (e.g., exceeds $75 in a week).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of managing collect phone calling limits comprising:
   determining if collect calls from one or more predetermined locations to a terminating phone number have exceeded a collect calls limit; and
   determining a future date when collect calls will be permitted from the one or more predetermined locations to the terminating phone number if the collect calls limit has been exceeded: and
   identifying the future date to a person associated with the terminating phone number.

2. A method as defined in claim 1 wherein identifying the future date to the person associated with the terminating phone number comprises placing a call to the terminating phone number to play an automated message identifying the future date.

3. A method as defined in claim 2 wherein the automated message indicates that collect calls from the one or more predetermined locations will be blocked until the future date.

4. A method as defined in claim 1 wherein identifying the future date to the person associated with the terminating phone number comprises playing an automated message identifying the future date to the person associated with the terminating phone number.

5. A method as defined in claim 4 wherein playing the automated message comprises playing the automated message during a last permitted call.

6. A method as defined in claim 1 further comprising storing the future date in a service representative accessible database to enable manual identification of the future date in response to an inquiry from a person associated with the terminating phone number.

7. A method of managing collect phone calling limits comprising:
   determining if collect calls from one or more predetermined locations to a terminating phone number have exceeded a collect calls limit;
   determining a future date when collect calls will be permitted from the one or more predetermined locations to the terminating phone number if the collect calls limit has been exceeded; and
   storing the future date in a service representative accessible database to enable manual identification of the future date in response to an inquiry from a person associated with the terminating phone number.

8. A method as defined in claim 7 further comprising identifying the future date in response to an inquiry from a person associated with the terminating phone number.

9. A method as defined in claim 7 wherein determining if collect calls from the one or more predetermined locations to the terminating phone number have exceeded the collect calls limit further comprises:
   determining call tolls for collect calls placed to terminating phone numbers from the one or more predetermined locations; and
   allocating the call tolls to the terminating phone numbers on a time period-by-time period basis.

10. A method as defined in claim 9 wherein the collect calls limit is referenced to a predetermined time period.

11. A method as defined in claim 10 wherein the predetermined time period is a number of hours, a number of days, a number of weeks, or a number of months.

12. A method as defined in claim 11 wherein the predetermined time period is a rolling time period.

13. A method as defined in claim 7 wherein the collect calls limit is a number of calls or a number of call attempts in a predetermined time period.

14. A method as defined in claim 7 wherein the one or more predetermined locations includes at least one correctional institution, hospital, school or military base.

15. An apparatus to manage collect phone calling limits comprising:
   a collect call limiter to determine if collect calls from the one or more predetermined locations to a terminating phone number have exceeded a collect calls limit;
   a block duration calculator to determine a future date when collect calls will be permitted from the one or more predetermined locations to the terminating phone number if the collect calls limit has been exceeded: and
   an automated outbound message dialer to place a call to the terminating phone number to play an automated message identifying the future date.

16. An apparatus as defined in claim 15 wherein the automated message indicates that collect calls from the one or more predetermined locations will be blocked until the future date.

17. An apparatus to manage collect phone calling limits comprising:
   a collect call limiter to determine if collect calls from the one or more predetermined locations to a terminating phone number have exceeded a collect calls limit; and
   a block duration calculator to determine a future date when collect calls will be permitted from the one or more predetermined locations to the terminating phone number if the collect calls limit has been exceeded; and
   an automated message device to play an automated message identifying the future date to a person associated with the terminating phone number.

18. An apparatus as defined in claim 17 wherein the automated message device plays the message during a last permitted call.

19. An apparatus as defined in claim 17 further comprising a service representative accessible database storing the future date to enable manual identification of the future date in response to an inquiry from a person associated with the terminating phone number.

20. An apparatus to manage collect phone calling limits comprising:
   a collect call limiter to determine if collect calls from the one or more predetermined locations to a terminating phone number have exceeded a collect calls limit;
   a block duration calculator to determine a future date when collect calls will be permitted from the one or more predetermined locations to the terminating phone number if the collect calls limit has been exceeded; and
   a service representative accessible database storing the future date to enable manual identification of the future date in response to an inquiry from a person associated with the terminating phone number.

21. An apparatus as defined in claim 20 wherein the collect call limiter further comprises:
   a call rating engine to determine call tolls for collect calls placed to terminating phone numbers from one or more predetermined locations, and to allocate the call tolls to the terminating phone numbers on a time period-by-time period basis.

22. An apparatus as defined in claim 21 wherein the collect calls limit is referenced to a predetermined time period.

23. An apparatus as defined in claim 22 wherein the predetermined time period is a number of hours, a number of days, a number of weeks, or a number of months.

24. An apparatus as defined in claim 22 wherein the predetermined time period is a rolling time period.

25. An apparatus as defined in claim 20 wherein the collect calls limit is a number of calls or a number of call attempts in a predetermined time period.

26. An apparatus as defined in claim 20 wherein the one or more predetermined locations include at least one correctional institution, hospital, school or military base.

27. An apparatus as defined in claim 26 further comprising:
    a vendor server associated with at least one of the correctional institutions; and
    a line information database identifying termination numbers which are blocked from receiving calls from the at least one of the correctional institutions.

28. An apparatus as defined in claim 27 wherein the vendor server provides call records to the collect call limiter.

29. An apparatus as defined in claim 28 wherein the collect call limiter and the block duration calculator are associated with the vendor server.

30. An apparatus as defined in claim 28 wherein the vendor server provides the call records to the collect call limiter in real time, quasi-continuously, or periodically.

31. An apparatus to manage collect phone calling limits comprising:
    a collect call limiter to determine if collect calls from the one or more predetermined locations to a terminating phone number have exceeded a collect calls limit;
    a block duration calculator to determine a future date when collect calls will be permitted from the one or more predetermined locations to the terminating phone number if the collect calls limit has been exceeded; and
    an automated inbound interactive voice response unit to identify the future date in response to an inquiry from a person associated with the terminating phone number.

32. A method of determining a future time period in which collect calls to a terminating number will be permitted comprising:
    determining sub-totals of collect call tolls respectively incurred in a series of time periods by the terminating number for calls from at least one predetermined location;
    determining a number of sequential time periods in the series of time periods wherein a sum of the sub-totals corresponding to the sequential time periods exceeds a toll limit, the sequential time periods being inclusive of a first time period; and
    identifying a time period occurring immediately after expiration of a number of time periods in the series of time periods less the number of sequential time periods as the future time period, the time period being at least one day in duration.

33. A method as defined in claim 32 wherein each of the time periods is a day.

34. A machine accessible medium storing machine readable instructions which, when executed, cause a machine to:
    determine if collect calls from one or more predetermined locations to a terminating phone number have exceeded a collect calls limit;
    determine a future date when collect calls will be permitted from the one or more predetermined locations to the terminating phone number if the collect calls limit has been exceeded; and
    identify the future date to a person associated with the terminating phone number.

35. A machine accessible medium as defined in claim 34 wherein the machine readable instructions cause the machine to identify the future date to the person associated with the terminating phone number by playing an automated message identifying the future date to the person associated with the terminating phone number.

36. A machine accessible medium as defined in claim 35 wherein playing the automated message comprises playing the automated message during a last permitted call.

37. A machine accessible medium as defined in claim 34 wherein the machine readable instructions cause the machine to determine if collect calls from the one or more predetermined locations to the terminating phone number have exceeded the collect calls limit by:
    determining call tolls for collect calls placed to terminating phone numbers from the one or more predetermined locations; and
    allocating the call tolls to the terminating phone numbers on a time period-by-time period basis.

38. A machine accessible medium as defined in claim 37 wherein the collect calls limit is referenced to a predetermined time period.

39. A machine accessible medium as defined in claim 38 wherein the predetermined time period is a number of hours, a number of days, a number of weeks, or a number of months.

40. A machine accessible medium as defined in claim 39 wherein the predetermined time period is a rolling time period.

41. A machine accessible medium as defined in claim 34 wherein the collect calls limit is a number of calls or a number of call attempts in a predetermined time period.

42. A machine accessible medium as defined in claim 34 wherein the one or more predetermined locations includes at least one correctional institution, hospital, school or military base.

43. A machine accessible medium storing machine readable instructions which, when executed, cause a machine to:
    determine if collect calls from one or more predetermined locations to a terminating phone number have exceeded a collect calls limit;
    determine a future date when collect calls will be permitted from the one or more predetermined locations to the terminating phone number if the collect calls limit has been exceeded; and
    store the future date in a service representative accessible database to enable manual identification of the future date in response to an inquiry from a person associated with the terminating phone number.

44. A method of managing collect phone calling limits comprising:
    determining if a sum of collect calls from one or more predetermined locations to two or more terminating phone numbers associated with a same street address have exceeded a collect calls limit; and
    determining a future date when collect calls will be permitted from the one or more predetermined locations to the terminating phone numbers if the collect calls limit has been exceeded.

* * * * *